US011190523B1

(12) United States Patent
McCracken et al.

(10) Patent No.: US 11,190,523 B1
(45) Date of Patent: Nov. 30, 2021

(54) POST-ACTIVATION INSTALLATION OF CUSTOM APPLICATIONS WITH SYSTEM PRIVILEGES

(71) Applicant: T-MOBILE INNOVATIONS LLC, Overland Park, KS (US)

(72) Inventors: Billy G. McCracken, Lenexa, KS (US); Hannah J. Sifuentes, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 139 days.

(21) Appl. No.: 16/719,979

(22) Filed: Dec. 18, 2019

(51) Int. Cl.
| | | |
|---|---|---|
| *H04W 4/50* | (2018.01) | |
| *H04L 29/06* | (2006.01) | |
| *G06F 9/54* | (2006.01) | |
| *H04L 29/08* | (2006.01) | |
| *G06F 8/61* | (2018.01) | |

(52) U.S. Cl.
CPC ............ *H04L 63/102* (2013.01); *G06F 8/61* (2013.01); *G06F 9/547* (2013.01); *H04L 67/02* (2013.01); *H04L 67/10* (2013.01); *H04W 4/50* (2018.02)

(58) Field of Classification Search
CPC ....... H04L 63/102; H04L 67/02; H04L 67/10; G06F 9/547; G06F 8/61; H04W 4/50
See application file for complete search history.

(56) References Cited

U.S. PATENT DOCUMENTS

| | | | | |
|---|---|---|---|---|
| 8,650,303 B1* | 2/2014 | Lang | ................... | H04L 67/10 709/226 |
| 2006/0259785 A1* | 11/2006 | Thibadeau | .............. | G06F 21/80 713/193 |
| 2011/0010699 A1* | 1/2011 | Cooper | .................... | G06F 8/71 717/169 |
| 2011/0099230 A1* | 4/2011 | Inapakolla | .......... | G06F 9/44536 709/206 |
| 2018/0150599 A1* | 5/2018 | Valdes | ................... | G16H 10/60 |
| 2018/0276003 A1* | 9/2018 | Roszak | ............... | G06F 11/1417 |
| 2020/0302062 A1* | 9/2020 | Rizos | .................... | G06F 21/575 |

\* cited by examiner

*Primary Examiner* — John B Walsh

(57) ABSTRACT

A mobile communication device. The mobile communication device comprises a radio frequency transceiver, a processor, a memory comprising a system partition and a non-system partition, wherein the system partition comprises a hidden application, and an installer application stored in the system partition of the memory. When executed by the processor, the installer application receives a first message comprising an identity of an enterprise and a communication address of an application download service, sends a second message to the communication address received in the first message, wherein the second message comprises the identity of the enterprise received in the first message, receives a third message that comprises an enterprise application associated with the identity of the enterprise, installs the enterprise application in the system partition of memory in the place of the hidden application, and sets the status of the enterprise application to visible status.

20 Claims, 8 Drawing Sheets

POST-ACTIVATION INSTALLATION OF CUSTOM APPLICATIONS WITH SYSTEM PRIVILEGES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be shipped by original equipment manufacturers unprovisioned for wireless communication service. After a mobile communication device (e.g., a mobile phone) is delivered to a user, the user may activate the phone to cause it to be provisioned for service on one or more wireless communication networks. The activation process may entail a wireless communication service provider associating an identity and/or authentication keys associated with the mobile communication device to a wireless communication service plan of the user, for example in a core network provisioning data store. The activation process may entail enabling premium communication services the user has paid for. The activation process may entail loading branding information onto the mobile communication device.

SUMMARY

In an embodiment, a method of configuring a mobile communication device is disclosed. The method comprises receiving a device-to-enterprise association list via an application programming interface (API) by a server computer and sending messages to each of a plurality of mobile communication devices identified in the device-to-enterprise association list by the server computer based on the device-to-enterprise association list, wherein each message sent by the server computer comprises an identity of an enterprise and a communication address of an application download service. The method further comprises receiving a first message by an installer application executing in a system partition of one of the plurality of mobile communication devices identified in the device-to-enterprise association list, wherein the first message comprises the identity of the enterprise and the communication address of the application download service and sending a second message by the installer application to the communication address received in the first message, wherein the second message comprises the identity of the enterprise received in the first message. The method further comprises receiving a third message by the installer application, wherein the third message comprises an enterprise application associated with the identity of the enterprise, installing the enterprise application in the system partition of the mobile communication device by the installer application in the place of a pre-loaded hidden application installed in the system partition of the mobile communication device, and setting the status of the enterprise application by the installer application to visible status.

In another embodiment, a mobile communication device is disclosed. The mobile communication device comprises a radio transceiver, a processor, a memory comprising a system partition and a non-system partition, wherein the system partition comprises a hidden application, and an installer application stored in the system partition of the memory. When executed by the processor, the installer application receives a first message via the radio transceiver comprising an identity of an enterprise and a communication address of an application download service, sends a second message via the radio transceiver to the communication address received in the first message, wherein the second message comprises the identity of the enterprise received in the first message, receives a third message via the radio transceiver that comprises an enterprise application associated with the identity of the enterprise, installs the enterprise application in the system partition of memory in the place of the hidden application, and sets the status of the enterprise application to visible status.

In yet another embodiment, a method of configuring a mobile communication device is disclosed. The method comprises receiving a first message by an installer application executing in a system partition of a mobile communication device after activation of the mobile communication device, wherein the first message comprises an identity of an enterprise and a communication address of an application download service and sending a second message by the installer application to the communication address received in the first message, wherein the second message comprises the identity of the enterprise received in the first message. The method further comprises receiving a third message by the installer application, wherein the third message comprises an enterprise application associated with the identity of the enterprise, installing the enterprise application in the system partition of the mobile communication device by the installer application in the place of a hidden application installed in the system partition of the mobile communication device before the activation of the mobile communication device, and setting the status of the enterprise application by the installer application to visible status.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
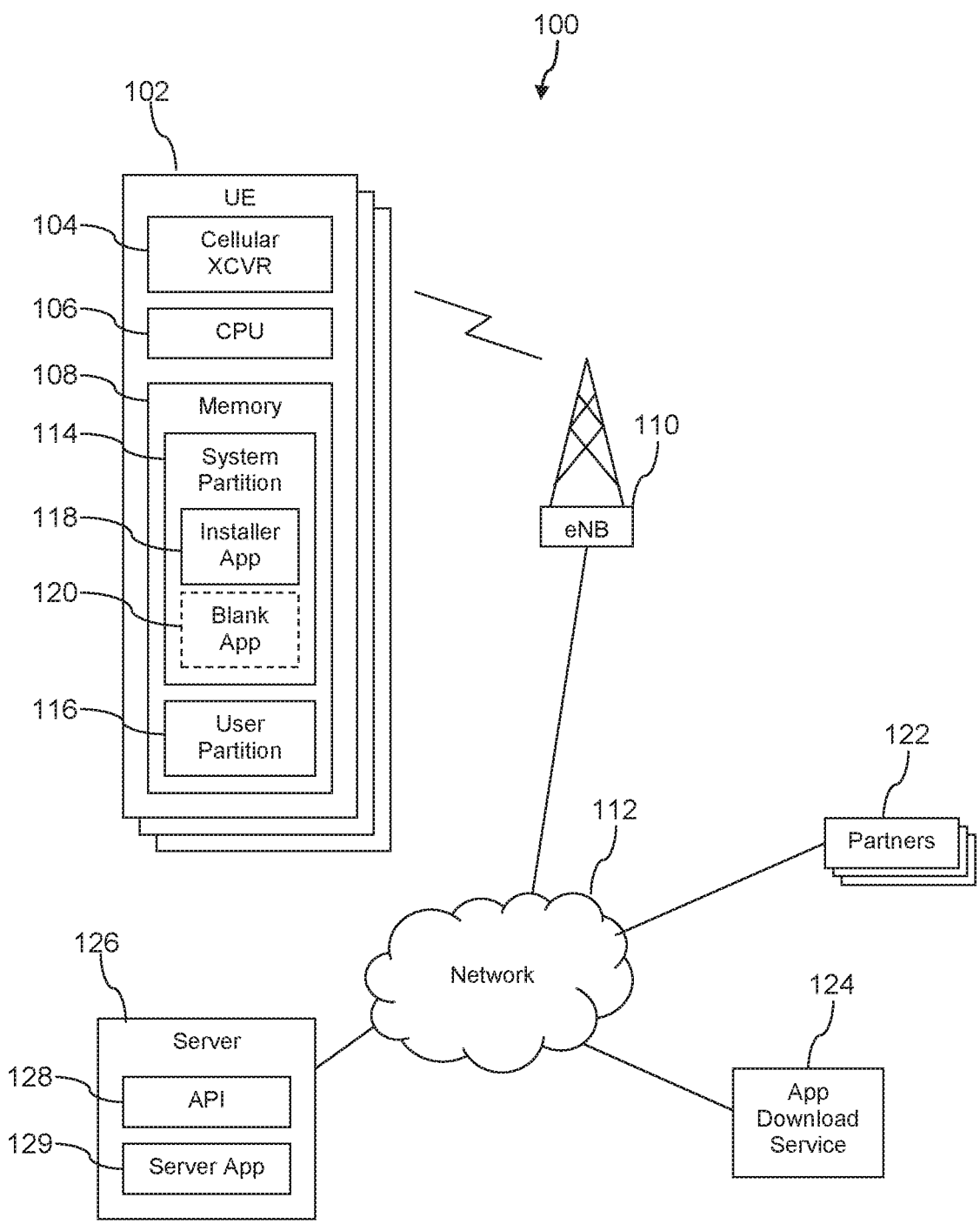
FIG. 1 is a block diagram of a system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An enterprise may wish to have a proprietary application (e.g., an enterprise application) installed on a mobile communication device after the device is shipped by an original equipment manufacturer (OEM). Proprietary applications or enterprise applications may be referred to as custom applications in some contexts. Additionally, the enterprise may wish for their application to be installed with system privileges. Customarily only pre-loaded applications stored in a system partition of the device memory are allowed by an operating system (OS) of a mobile communication device to enjoy system privileges. Said in another way, customarily only applications that are loaded into a system partition of a memory of the mobile communication device are granted system privileges by the operating system, whereby to enforce security policies. Pre-loaded applications are presumed to be secure, because the OEM may validate, test, and control the content of these pre-loaded applications before they install them on the device. Pre-loaded applications that have system privileges can access powerful execution resources of the OS and access privileged data protected by the OS security policies.

The present disclosure teaches installing a hidden application in the system partition of memory by the OEM that is not visible when the mobile communication device is activated. An installer application, also located in the system partition of memory, downloads an enterprise application from an application download service, installs the enterprise application in the system partition in place of the hidden application, renames the application, and makes the enterprise application visible. In this way, the enterprise application can be installed after delivery of the mobile communication device to an end user and after activation of the mobile communication device while still arranging for the enterprise application to execute with system privileges.

In an embodiment, healthcare providers may subsidize purchase of mobile communication devices for individuals who qualify for participation in a government promoted phone program. The healthcare providers may desire that their proprietary healthcare application (e.g., an enterprise application) be installed as a pre-loaded application on the subsidized mobile communication devices they have subsidized. This may not be practicable, however, because mobile communication devices otherwise identical to each other but having different software loads are associated with different stock keeping unit (SKU) codes. Mobile communication devices having different SKUs are required by regulatory bodies to be independently tested at considerable cost to the OEM and/or the wireless communication service provider that provides wireless communication service to the devices. In the context of a low-cost subsidized mobile communication device (e.g., a "free phone"), this additional testing and/or certification cost may be prohibitive.

The healthcare providers, for example, may fear that users will not download and install their application on the mobile phone or may later uninstall their application. If their proprietary healthcare application is pre-loaded in the system partition of the mobile phone, the user doesn't have to be trusted to download and install their application and furthermore the user cannot uninstall their application (because lay users cannot typically modify applications stored in the system partition). The teachings of the present disclosure can provide many of the properties of a pre-loaded application that the healthcare providers, and other enterprises, desire while avoiding the additional costs associated with multiple SKUs. The installer application can automatically execute and install the enterprise application in place of the hidden application, without relying on the user taking action to download the enterprise application. Because the enterprise application is installed in the system partition by the installer application, the lay user cannot uninstall it.

In an embodiment, a server computer in a wireless communication service provider network extends an application programming interface (API) for use by mobile communication device fulfillment centers and/or enterprises to associate identities of mobile communication devices to an enterprise. For example, a healthcare provider uses the API to indicate that it has purchased mobile phones with specified mobile equipment identities (MEIDs) and to indicate its enterprise identity code. The server computer enters this data in a data store. When one of the mobile communication devices associated with the healthcare provider activates and authenticates into the radio access network (RAN) of the wireless communication service provider, the server may be notified and send a message to the mobile communication device providing a communication address (e.g., a uniform resource locator (URL) or a uniform resource identifier (URI)) of an application download service and providing the enterprise identity code. The installer application of the device sends a request message to the communication address that includes the enterprise identity code. The server computer identified by the communication address maps the enterprise identity code to an application and downloads the enterprise application to the device. The installer application of the device installs the downloaded enterprise application over the hidden application in the system partition of the device, renames the hidden application to a name defined by the enterprise application, and sets the status of the installed enterprise application to visible. At this point the enterprise application installed on the device behaves substantially as if it were a pre-loaded application.

The approach described provides benefits and advantages over an alternative solution of pre-loading a plurality of alternative applications in the system partition. First, in the system described herein, the limited memory size of the system partition is not consumed by a plurality of applications which will not in fact be activated. For example, in the alternative solution approach, if 5 different applications were preloaded and only one of those applications was activated, 4 applications would unnecessarily consuming limited memory space in the system partition. Second, the approach described herein supports downloading and installing the latest version of the desired application. The applications associated with different competing enterprises and/or healthcare companies may be changing and refining on an on-going basis. If a plurality of applications were pre-loaded at time of manufacturing, the activated application may be outdated by the time the phone is delivered to a user. The present disclosure teaches overcoming the problems associated with pre-loading a specific enterprise application or an expanded set of enterprise applications on a mobile communication device by using a distributed computer system that involves collaboration between an application executing on the mobile communication device (e.g., the installer application in the system partition of the mobile communication device), a server computer managed by a wireless communication service provider, and computers managed by fulfillment centers and/or enterprise servers.

Turning now to FIG. 1, a communication system 100 is described. A mobile communication device (user equipment—UE) 102 comprises a cellular radio transceiver 104, a processor 106, and a memory 108. The UE 102 is able to establish communication with a network 112 via a wireless link provided by a cell site 110 according to one or more of a 5G, a long term evolution (LTE), a code division multiple access (CDMA), a global system for mobile communications (GSM), or another telecommunication protocol. The system 100 comprises any number of UEs 102. In an embodiment, the UE 102 is one of a mobile phone, a smart phone, a wearable computer, a headset computer, a laptop computer, a notebook computer, or a tablet computer. The network 112 comprises one or more private networks, one or more public networks, or a combination thereof.

The memory 108 comprises a system partition 114 and a user partition 116. An installer application 118 and one or more blank applications 120 are stored in the system partition 114. Access to the system partition 114 is restricted by an operating system (OS) of the UE 102. For example, lay users are prevented by the OS from altering data and/or instructions stored in the system partition (e.g., a skilled hacker with special knowledge and special tools may be able to defeat the security functions of the OS and modify data and instructions in the system partition). At least initially, the blank application 120 is assigned a hidden status by the OS. In some contexts, the blank application 120 may be referred to as a hidden application.

A plurality of partners 122 may work with an application download service 124 to support downloading their enterprise applications to the UEs 102. The partners 122 may be implemented as computers operated by different enterprises, for example computers operated by different healthcare providers and/or health insurance providers. The partners 122 may each provide one or more enterprise applications to the application download service 124 and instruct the download service 124 to associate an enterprise identity code to the one or more enterprise applications. When a UE 102 sends a properly formatted application download request that comprises the enterprise identity code of an enterprise, the application download service 124 may download one or more application associated with the enterprise identified to the UE 102 for installation. In an embodiment, the application download service 124 may be provided from or deployed in a cloud computing environment.

A wireless communication service provider computer system 126 extends an application programming interface (API) 128 for use by the plurality of partners 122 in defining an association between identities of UEs 102 and identities of the partners 122. The partners 122 identify a plurality of UEs 102 that are associated with their enterprise identity code. For example, an enterprise may use their partner computer system 122 to indicate that a range of mobile equipment identities (MEIDs) are associated with them and hence to their enterprise identity code. The subject enterprise may have purchased the UEs 102 for use by their employees. The subject enterprise may be a healthcare provider or a health insurance provider that is subsidizing the cost of the UEs 102 that are being shipped to individuals pursuant to a government promoted free phone program for needy citizens.

The wireless communication service provider computer system 126 executes a server application 129 that may prompt UEs 102 to download one or more enterprise application from the application download service 124. For example, when one of the UEs 102 is activated or first authenticates into a radio access network (RAN) operated by the wireless communication service provider, the server application 129 may be notified of this event and be provided the MEID of the UE 102. The server application 129 may use the MEID to determine that the UE 102 is affiliated with one of the partners 122 and associates the UE 102 to the corresponding enterprise identity code of the partner 122. The server application 129 sends a message to the installer application 118 on the UE 102 comprising the enterprise identity code and a communication address of the application download service 124. In response to receiving this message, the installer application 118 sends a download request message to the application download service 124 (e.g., to the system associated with the communication address) comprising the enterprise identity code.

The application download service 124 looks up one or more enterprise applications associated with the enterprise identity code and downloads the one or more enterprise applications to the UE 102. The installer application 118 installs the one or more downloaded enterprise application into the system partition 114 over the one or more blank applications 120, renames each of the one or more enterprise applications, and sets the status of each of the one or more enterprise applications to visible. This may be referred to as a push operation model in some contexts.

Alternatively, rather than prompting UEs 102 to download applications, the service provider computer system 126 may respond to requests from the UEs 102 for information for use in downloading applications. For example, the installer application 118 may send a request message to the server application 129 on the event of the UE 102 completing activation and/or authentication into the RAN. The request message may comprise a MEID or other identity of the UE 102. This may be referred to as a pull operation model in some contexts.

The server application 129 may then look up an enterprise identity code based on the MEID and look up a communication address of the application download service 124 based on the enterprise identity code (e.g., different partners 122 and/or enterprises may rely upon different application download services 124). When the UE 102 and/or installer application 118 is supplied with the communication address of the application download service 124 and the enterprise identity code, the installer application 118 may request and install one or more enterprise applications as described above for the push operation model.

Figure 2A:
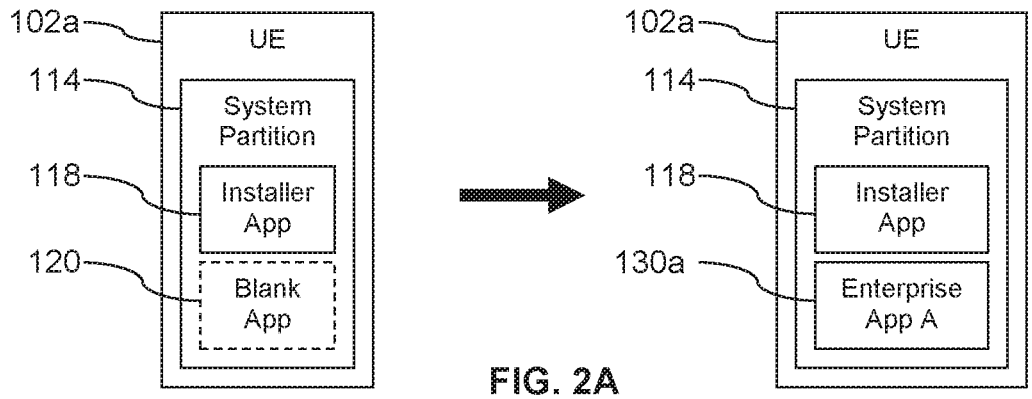
FIG. 2A is a block diagram illustrating an installation of a first enterprise application in a mobile communication device according to an embodiment of the disclosure.
Figure 2B:
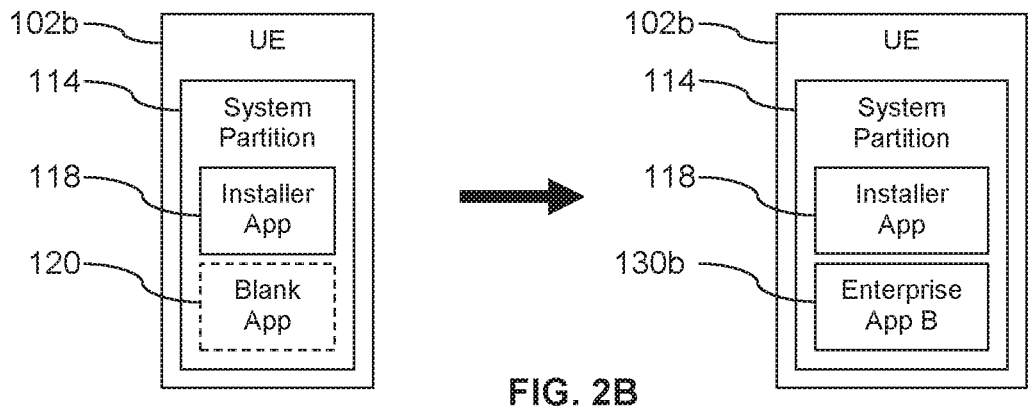
FIG. 2B is a block diagram illustrating an installation of a second enterprise application in a mobile communication device according to an embodiment of the disclosure.
Figure 2C:
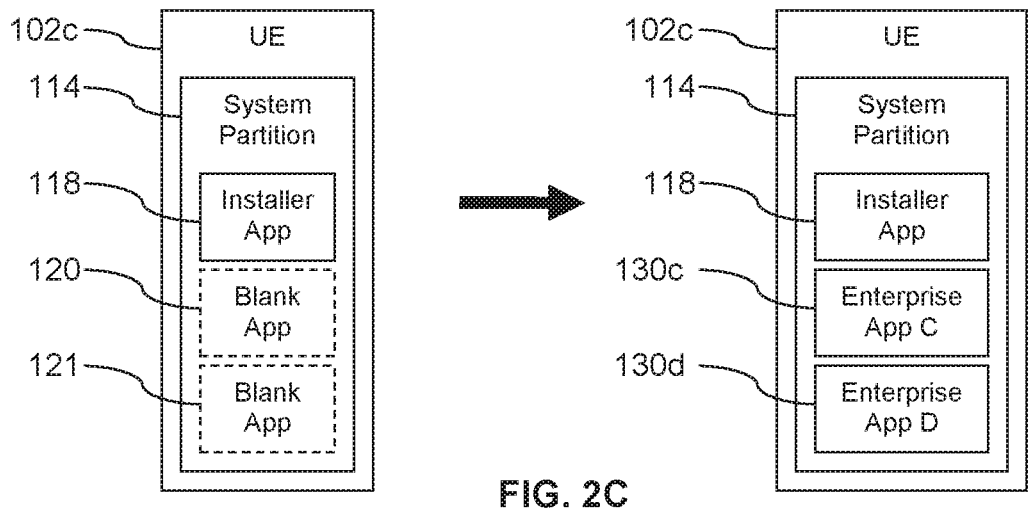
FIG. 2C is a block diagram illustrating an installation of a third enterprise application and a fourth enterprise application into a mobile communication device according to an embodiment of the disclosure.

Turning now to FIG. 2A, FIG. 2B, and FIG. 2C, the UE 102 before and after downloading and installation of one or more enterprise applications is described. A first UE 102a illustrated on the left side of FIG. 2A is updated by the installer application 118 to download and install a first enterprise application 130a over the blank application 120, to rename the first enterprise application 130a, and to make the first enterprise application 130a visible. A second UE 102b illustrated on the left side of FIG. 2B is updated by the installer application 118 to download and install a second enterprise application 130b over the blank application 120, to rename the second enterprise application 130b, and to make the second enterprise application 130b visible. The server application 129 executing on the wireless communication service provider computer system 126 may provide a first enterprise identity code to the first UE 102 based on a first MEID of the first UE 102 and may provide a second different enterprise identity code to the second UE 102 based on a second MEID of the second UE 102. The application download service 124 may map the two different enterprise identity codes to two different enterprise applications to be downloaded to and installed on the two different UEs 102a, 102b. Thus, while the first and second UE 102a, 102b start out substantially identical (e.g., may be associated with the same SKU) they are configured differently by the installer application 118 based on the dynamically associated enterprise identity code.

A third UE 102c illustrated on the left side of FIG. 2C has two blank applications, blank application 120 and second blank application 121. A UE 102 may be pre-loaded with any number of blank applications. The third UE 102c is updated by the installer application 118 to download and install a third enterprise application 130c over the blank application 120, to rename the third enterprise application 130c, to make the third enterprise application 130c visible, to download and install a fourth enterprise application 130c over the second blank application 121, to rename the fourth enterprise application 130d, and to make the fourth enterprise application 130d visible.

In an embodiment, the UE 102 may be pre-loaded with a predefined number of blank applications 120 and the installer 118 may not install enterprise applications over each of these blank applications. For example, the OEM may pre-load five blank applications 120 on the UEs 102, and a first enterprise that buys some of the UEs 102 only installs one enterprise application in the system partition 114 as described above, thereby leaving four pre-loaded blank applications 120 on its UEs 102 indefinitely. In another example, a second enterprise that buys some of the UEs 102 with five blank applications pre-loaded may install three enterprise applications in the system partition 114 as described above, thereby leaving two pre-loaded blank applications 120 on its UEs 102 indefinitely.

Figure 3:
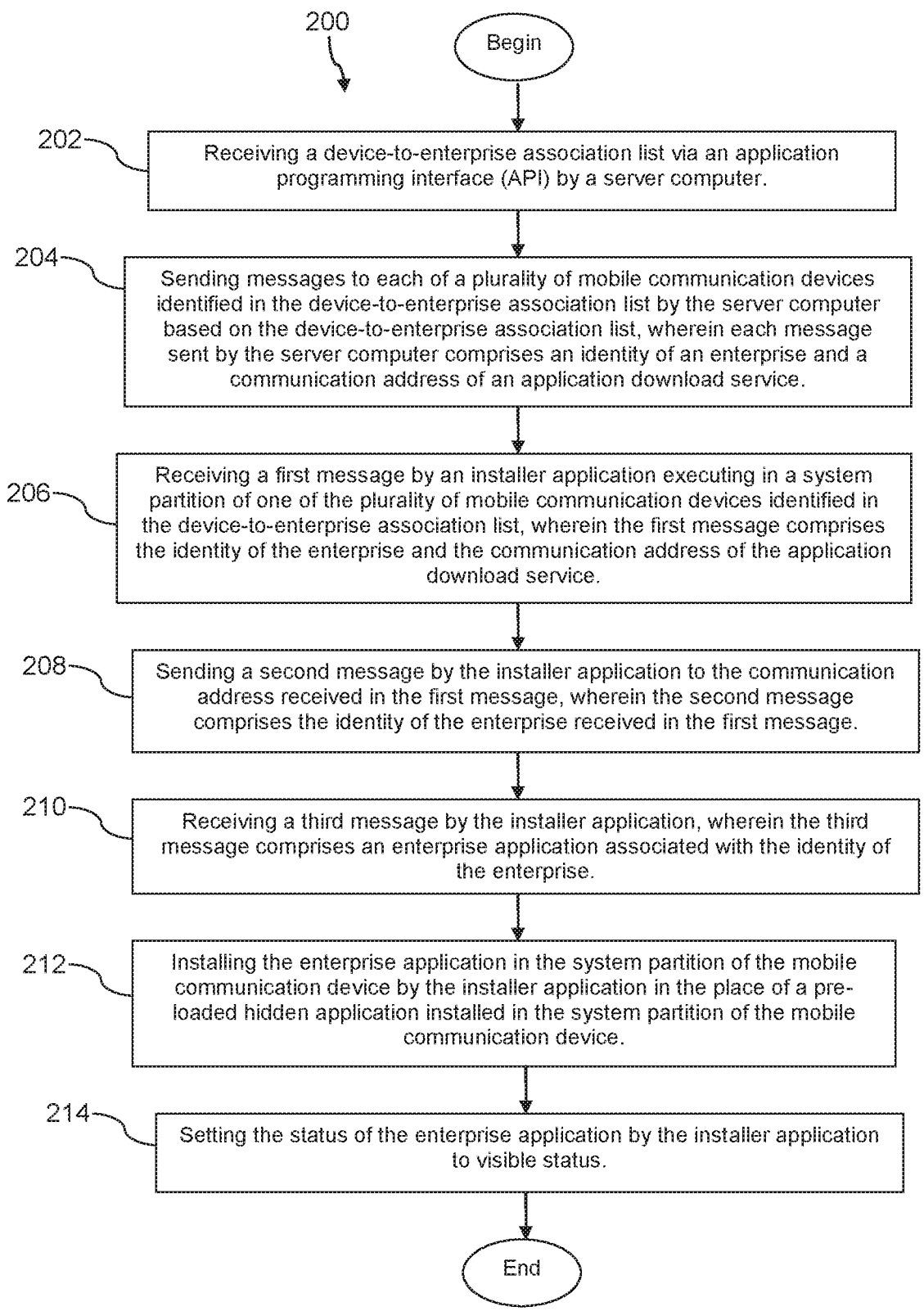
FIG. 3 is a flow chart of a method according to an embodiment of the disclosure.

Turning now to FIG. 3, a method 200 is described. In an embodiment, method 200 is a method of configuring a mobile communication device. At block 202, method 200 comprises receiving a device-to-enterprise association list via an application programming interface (API) by a server computer.

At block 204, method 200 comprises sending messages to each of a plurality of mobile communication devices identified in the device-to-enterprise association list by the server computer based on the device-to-enterprise association list, wherein each message sent by the server computer comprises an identity of an enterprise and a communication address of an application download service. At block 206, method 200 comprises receiving a first message by an installer application executing in a system partition of one of the plurality of mobile communication devices identified in the device-to-enterprise association list, wherein the first message comprises the identity of the enterprise and the communication address of the application download service. The first message may be received via the radio transceiver 104.

At block 208, method 200 comprises sending a second message by the installer application to the communication address received in the first message, wherein the second message comprises the identity of the enterprise received in the first message. The second message may be sent via the radio transceiver 104. At block 210, method 200 comprises receiving a third message by the installer application, wherein the third message comprises an enterprise application associated with the identity of the enterprise. The third message may be received via the radio transceiver 104. In an embodiment, the processing of blocks 206, 208, and 210 are performed by the installer application 118 without providing user visibility to these actions.

At block 212, method 200 comprises installing the enterprise application in the system partition of the mobile communication device by the installer application in the place of a pre-loaded hidden application installed in the system partition of the mobile communication device. At block 214, method 200 comprises setting the status of the enterprise application by the installer application to visible status. In an embodiment, the method 200 further comprises installing a second enterprise application in the system partition of the mobile communication device by the installer application in the place of a second pre-loaded hidden application installed in the system partition of the mobile communication device and setting the status of the second enterprise application by the installer application to visible status. In an embodiment, a plurality of hidden applications may be pre-loaded by an OEM, and the installer application may download and install enterprise applications over all or some of those pre-loaded hidden applications.

Figure 4:
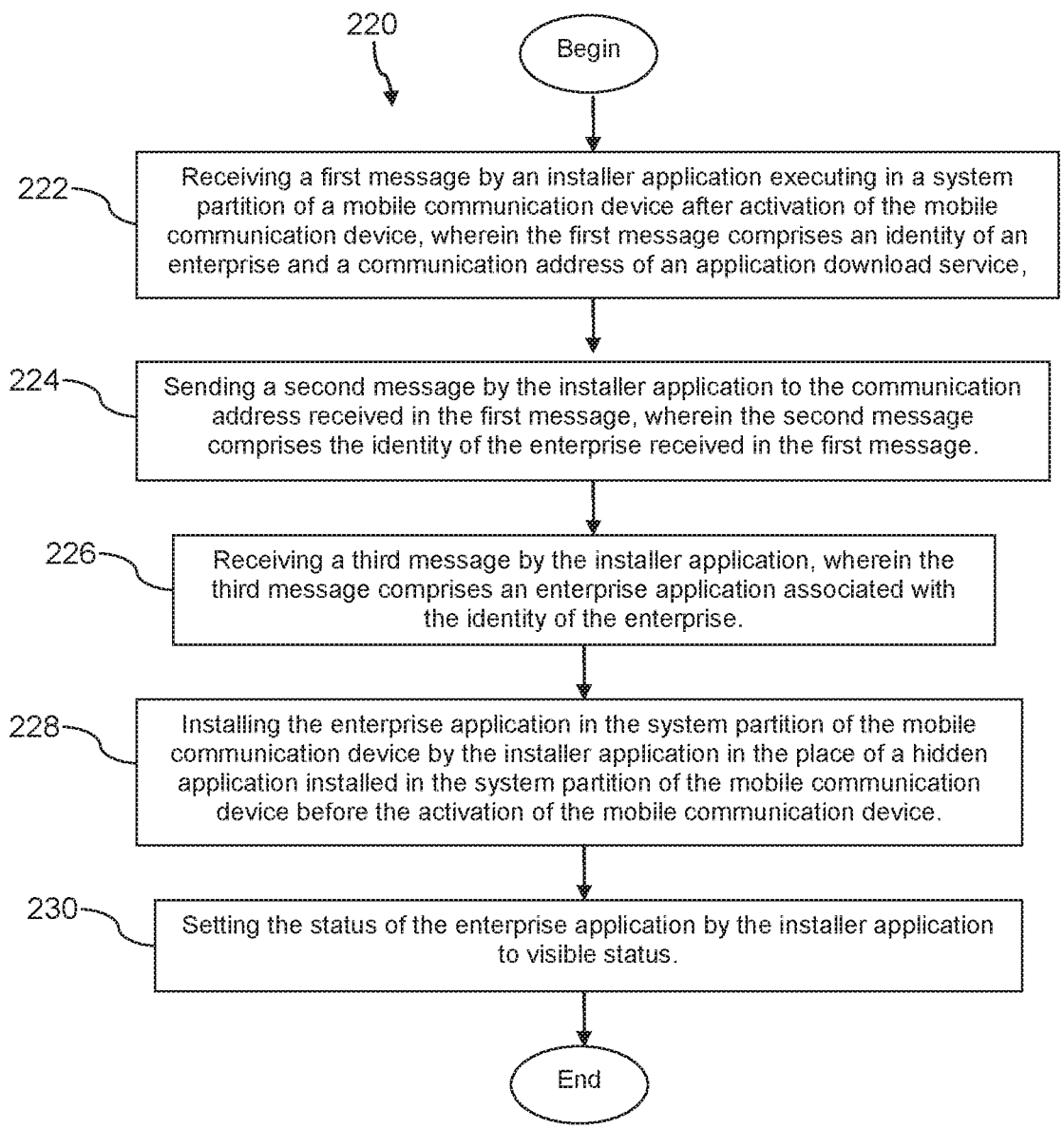
FIG. 4 is a flow chart of another method according to an embodiment of the disclosure.

Turning now to FIG. 4, a method 220 is described. In an embodiment, method 220 is a method of configuring a mobile communication device. At block 222, method 220 comprises receiving a first message by an installer application executing in a system partition of a mobile communication device after activation of the mobile communication device, wherein the first message comprises an identity of an enterprise and a communication address of an application download service.

At block 224, method 220 comprises sending a second message by the installer application to the communication address received in the first message, wherein the second message comprises the identity of the enterprise received in the first message. In an embodiment, the second message may further comprise an identity of the mobile communication device (e.g., the MEID of the UE 102), whereby an association of the mobile communication device and the identity of the enterprise is confirmed by the application download service 124 before it transmits the third message to the device. At block 226, method 220 comprises receiving a third message by the installer application, wherein the third message comprises an enterprise application associated with the identity of the enterprise.

At block 228, method 220 comprises installing the enterprise application in the system partition of the mobile communication device by the installer application in the place of a hidden application installed in the system partition of the mobile communication device before the activation of the mobile communication device. At block 230, method 220 comprises setting the status of the enterprise application by the installer application to visible status. In an embodiment, a plurality of hidden applications are installed in the system partition of the mobile communication device by an OEM of the device. In an embodiment, at least three different hidden applications are installed in the system partition of the mobile communication device by the OEM of the device.

Figure 5:
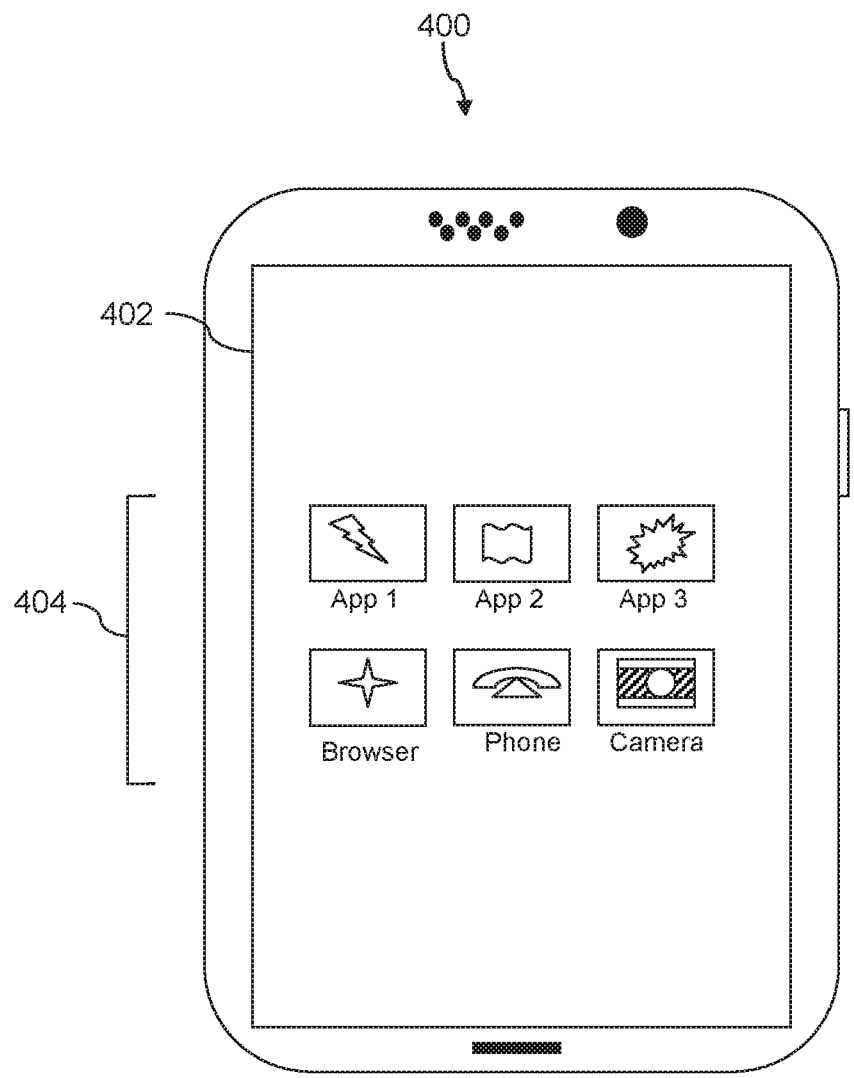
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
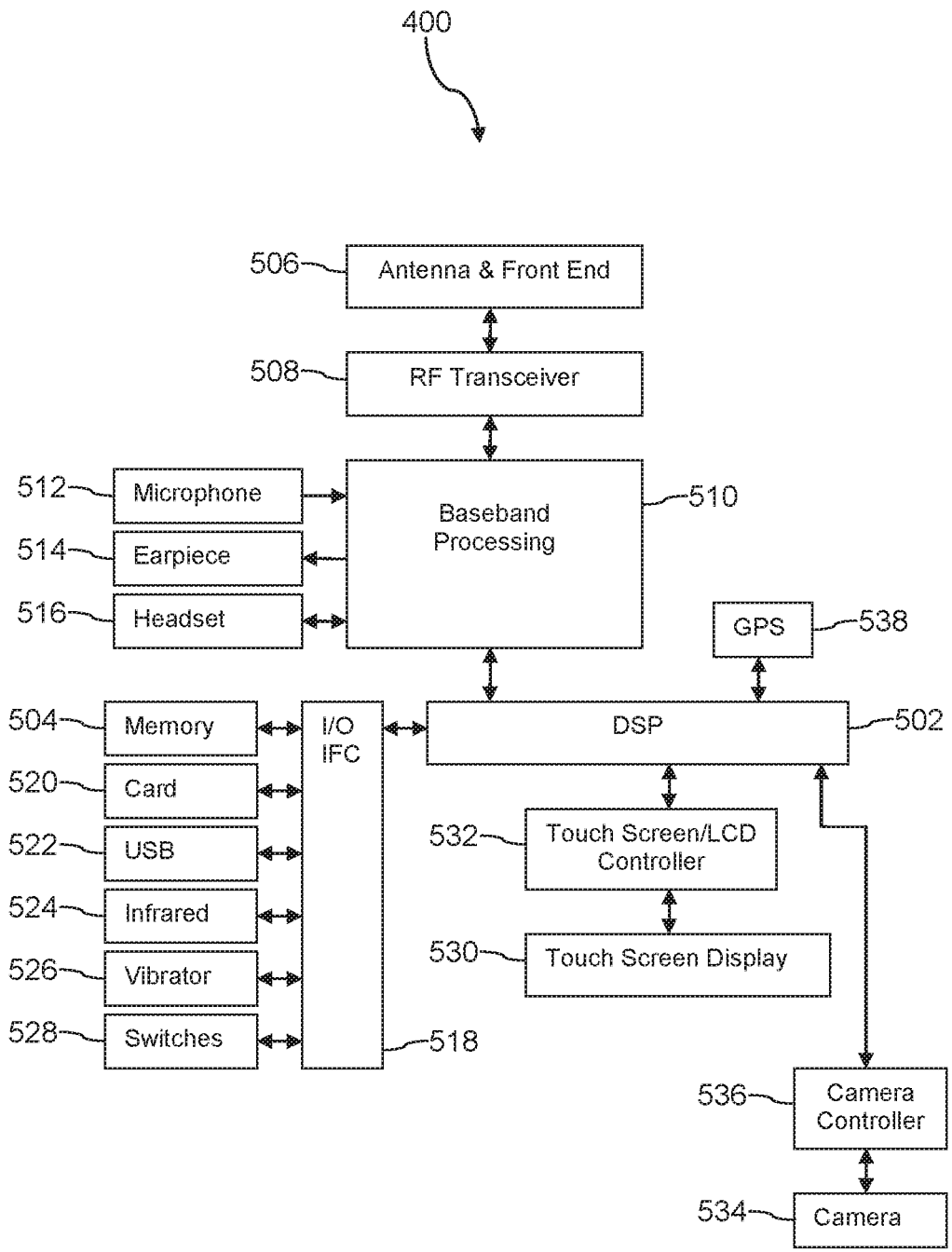
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen controller 532 couples the DSP 502 to the touch screen display 530. The GPS receiver 538 is coupled to the DSP 502 to decode global positioning system signals, thereby enabling the UE 400 to determine its position.

Figure 7A:
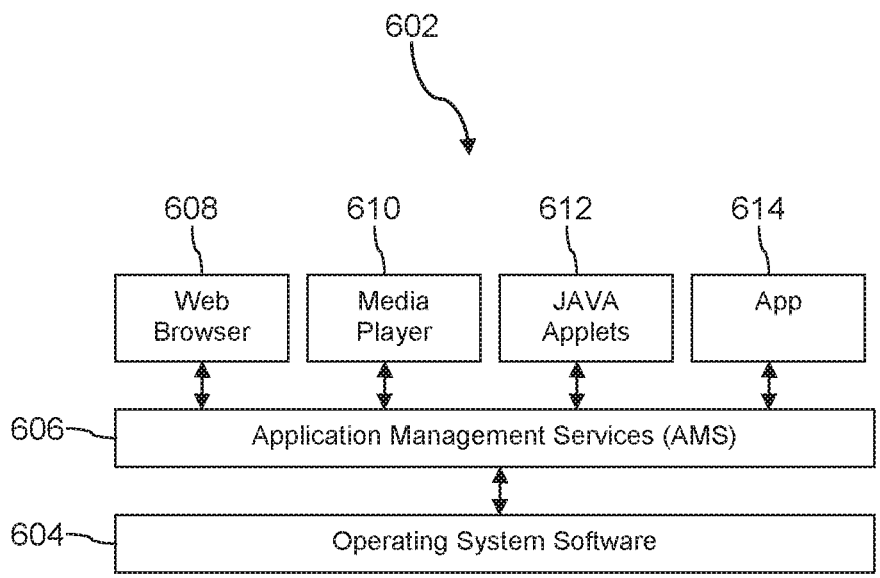
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
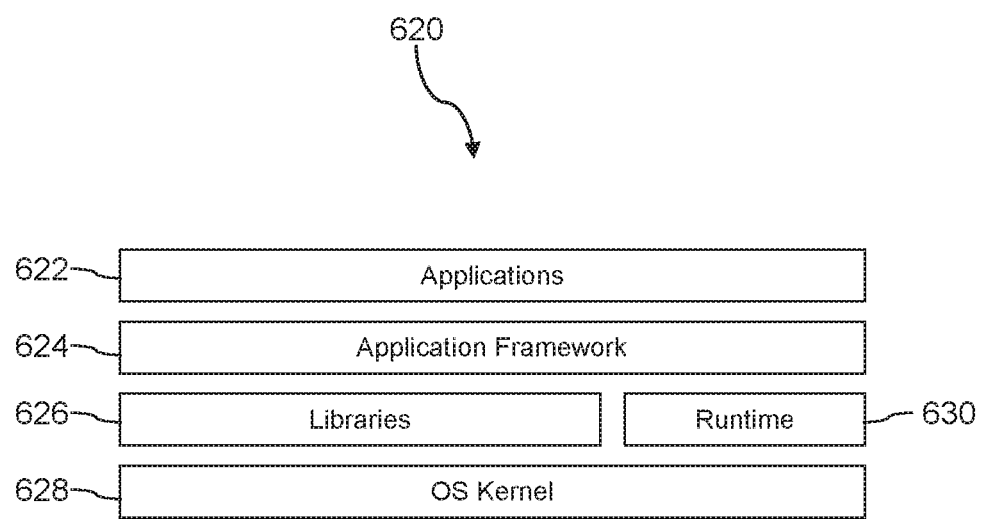
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
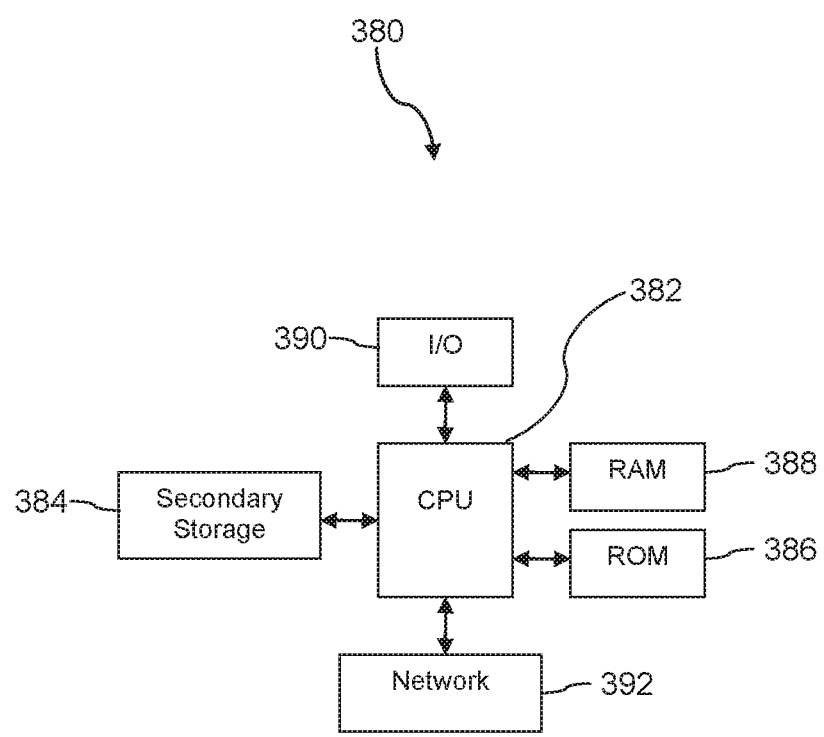
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of configuring a mobile communication device, comprising:
   receiving a device-to-enterprise association list via an application programming interface (API) by a server computer;
   sending messages to each of a plurality of mobile communication devices identified in the device-to-enterprise association list by the server computer based on the device-to-enterprise association list, wherein each message sent by the server computer comprises an identity of an enterprise and a communication address of an application download service, and wherein each mobile communication device of the plurality of mobile communication devices is pre-loaded by an original equipment manufacturer (OEM) with a hidden application in the system partition that is not visible when the mobile communication device is activated;
   receiving a first message by an installer application executing in the system partition of the mobile communication device identified in the device-to-enterprise association list, wherein the first message comprises the identity of the enterprise and the communication address of the application download service;
   sending a second message by the installer application to the communication address received in the first message, wherein the second message comprises the identity of the enterprise received in the first message;
   receiving a third message by the installer application, wherein the third message comprises an enterprise application associated with the identity of the enterprise;
   installing the enterprise application in the system partition of the mobile communication device by the installer application in the place of the pre-loaded hidden application installed in the system partition of the mobile communication device, wherein installing the enterprise application over the pre-loaded hidden application in the system partition allows the enterprise application to have system privileges; and
   setting the status of the enterprise application by the installer application to visible status.

2. The method of claim 1, wherein the communication address of the application download service is a uniform resource locator (URL).

3. The method of claim 1, wherein the application download service is provided from a cloud computing environment.

4. The method of claim 1, wherein the device-to-enterprise list associates a list of mobile equipment identities (MEIDs) to an enterprise identity code.

5. The method of claim 1, wherein the enterprise application is a healthcare provider application.

6. The method of claim 1, wherein the installer application sends the second message, receives the third message, and installs the enterprise application without providing user visibility to these actions.

7. The method of claim 1, further comprising:
   installing a second enterprise application in the system partition of the mobile communication device by the installer application in the place of a second pre-loaded hidden application installed in the system partition of the mobile communication device; and
   setting the status of the second enterprise application by the installer application to visible status.

8. A mobile communication device, comprising:
   a radio transceiver;
   a processor;
   a memory comprising a system partition and a non-system partition, wherein the system partition comprises a hidden application pre-loaded by an original equipment manufacturer, the hidden application not visible when the mobile communication device is activated; and
   the installer application stored in the system partition of the memory that, when executed by the processor
      receives a first message via the radio transceiver comprising an identity of an enterprise and a communication address of an application download service,
      sends a second message via the radio transceiver to the communication address received in the first message, wherein the second message comprises the identity of the enterprise received in the first message,
      receives a third message via the radio transceiver that comprises an enterprise application associated with the identity of the enterprise,
      installs the enterprise application in the system partition of memory in the place of the hidden application, wherein installing the enterprise application over the pre-loaded hidden application in the system partition allows the enterprise application to have system privileges, and
      sets the status of the enterprise application to visible status.

9. The mobile communication device of claim 8, wherein the mobile communication device is one of a mobile phone, a smart phone, a wearable computer, a headset computer, a laptop computer, a notebook computer, or a tablet computer.

10. The mobile communication device of claim 8, wherein the radio transceiver is configured to communicate with a cell site according to at least one of a 5G, a long term evolution (LTE), a code division multiple access (CDMA), a global system for mobile communications (GSM), or another telecommunication protocol.

11. The mobile communication device of claim 8, wherein the second message further comprises a mobile equipment identity (MEID) of the mobile communication device.

12. The mobile communication device of claim 8, wherein the installer application sends a message via the radio transceiver requesting the identity of the enterprise before it receives the first message.

13. The mobile communication device of claim 8, wherein the system partition comprises a second hidden application and the installer application installs a second enterprise application in the system partition of memory in the place of the second hidden application and sets the status of the second enterprise application to visible status.

14. The mobile communication device of claim 13, wherein the third message comprises the second enterprise application.

15. A method of configuring a mobile communication device, comprising:
   receiving a first message by an installer application executing in a system partition of a mobile communication device after activation of the mobile communication device, wherein the first message comprises an identity of an enterprise and a communication address of an application download service, and wherein the mobile communication device is pre-loaded by an original equipment manufacturer with a hidden application in the system partition that is not visible when the mobile communication device is activated;

sending a second message by the installer application to the communication address received in the first message, wherein the second message comprises the identity of the enterprise received in the first message;

receiving a third message by the installer application, wherein the third message comprises an enterprise application associated with the identity of the enterprise;

installing the enterprise application in the system partition of the mobile communication device by the installer application in the place of a hidden application installed in the system partition of the mobile communication device before the activation of the mobile communication device, wherein installing the enterprise application over the pre-loaded hidden application in the system partition allows the enterprise application to have system privileges; and setting the status of the enterprise application by the installer application to visible status.

16. The method of claim 15, wherein the second message comprises an identity of the mobile communication device, whereby an association of the mobile communication device and the identity of the enterprise is confirmed by an application download service before it transmits the third message to the mobile communication device.

17. The method of claim 15, wherein the mobile communication device is one of a mobile phone, a smart phone, a wearable computer, a headset computer, a laptop computer, a notebook computer, or a tablet computer.

18. The method of claim 15, wherein the enterprise application is a healthcare application.

19. The method of claim 15, wherein a plurality of different hidden applications are installed in the system partition of the mobile communication device by the OEM of the device.

20. The method of claim 19, wherein at least three different hidden applications are installed in the system partition of the mobile communication device by the OEM of the device.

* * * * *